(12) United States Patent
Kitamura (10) Patent No.: US 6,717,903 B2
(45) Date of Patent: Apr. 6, 2004

(54) DISC TRAY

(75) Inventor: Takatoyo Kitamura, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 182 days.

(21) Appl. No.: 09/957,543

(22) Filed: Sep. 21, 2001

(65) Prior Publication Data

US 2002/0036969 A1 Mar. 28, 2002

(30) Foreign Application Priority Data

Sep. 26, 2000 (JP) .......................................... 2000-292803

(51) Int. Cl.$^7$ ................................................ G11B 17/04
(52) U.S. Cl. ......................................................... 369/75.2
(58) Field of Search ................................. 369/75.1, 75.2

(56) References Cited

U.S. PATENT DOCUMENTS

| | | | |
|---|---|---|---|
| 5,528,566 A | * | 6/1996 | McGee et al. ............ 369/30.86 |
| 5,737,304 A | * | 4/1998 | Soga et al. ................. 369/247 |
| 5,930,218 A | * | 7/1999 | Mitsui et al. ............... 369/77.1 |
| 6,208,606 B1 | * | 3/2001 | Saito ........................ 369/77.1 |
| 6,295,265 B1 | * | 9/2001 | Cundiff, Sr. ............... 369/75.2 |
| 6,552,989 B2 | * | 4/2003 | Morinaga .................. 369/75.2 |

FOREIGN PATENT DOCUMENTS

| | | | | | |
|---|---|---|---|---|---|
| JP | 08235713 A | * | 9/1996 | ......... | G11B/17/04 |
| JP | 10027407 A | * | 1/1998 | ......... | G11B/17/04 |
| JP | 11039762 A | * | 2/1999 | ......... | G11B/17/04 |

* cited by examiner

*Primary Examiner*—William Klimowicz
(74) *Attorney, Agent, or Firm*—Morgan, Lewis & Bockius LLP (57) ABSTRACT

In a disc tray (T) having a tray main body (1) to which disc holders (2) are mounted at a plurality of portions in a periphery of a disc set portion, there is provided with a movable connecting member (3) transmitting an opening and closing operation of optional one disc holder (2a) to the other disc holders (2) so as to open and close the other disc holders (2). The movable connecting member (3) can be formed by combining a plurality of rod bodies (31, 32).

7 Claims, 10 Drawing Sheets

DISC TRAY

BACKGROUND OF THE INVENTION

1. [Technical Field]

The present invention relates to a disc tray used at a time of taking a disc corresponding to a recording medium such as a magnetic disc, an optical disc and the like in and out a drive.

2. [Related Art]

There are descriptions about the disc tray in the Unexamined Japanese Patent Application Publication Nos. Hei8-235713, Hei10-27407 and Hei11-39762 and the like. In accordance with the publications, there is described a matter that disc holders serving for preventing a disc set in a disc set portion of a disc tray from falling away from the disc set portion are provided at a plurality of portions of the disc tray attached to the drive. It is necessary to prevent the disc from falling away in the disc holder mentioned above, mainly in the case of using the disc tray in a stand-up attitude, in other words, the case that the disc tray is equipped in the drive in a vertical attitude.

As mentioned above, in the disc tray equipped in the vertical attitude drive, it is necessary to hold the disc by the disc holder so as to prevent the disc from falling away the disc set portion, however, in the disc tray equipped in the horizontal attitude drive, it is not always necessary to hole the disc by the disc holder.

In this case, in the conventional disc tray, there are structures in which hook-shaped disc holders are swingably provided at a plurality of portions around the disc set portion. Then, the disc is set in the disc set portion and thereafter the disc holders provided at a plurality of portions around the disc set portion are independently rotated one by one by fingers so as to hold the disc. Further, at a time of taking out the disc received in the disc set portion, the disc holders are independently rotated one by one by the fingers so as to move to a position capable of taking out the disc.

[Problems to be Solved]

However, there is a problem that it is bother and troublesome to independently operate a plurality of disc holders one by one by the fingers as in the conventional manner.

SUMMARY OF THE INVENTION

The present invention is made by taking the conditions mentioned above into consideration, and an object of the present invention is to provide a disc tray which simultaneously operates disc holders at the other portions in the same manner only by operating one disc holder at a time of attaching and detaching a disc.

Further, another object of the present invention is to provide a disc tray that can set a disc to a disc set portion or taking out from the disc set portion by using only one hand.

Further, the other object of the present invention is to provide a disc tray which can evacuate a disc holder to a position not standing in the way of taking a disc in and out in the case of using a drive in a horizontal attitude in which it is unnecessary to hold the disc by the disc holder.

Further, the other object of the present invention is to provide a disc tray which can operate a disc holder in parallel to a disc chucking operation executed after a disc tray is completely pulled to a drive and a disc unchucking operation executed before the disc tray is pushed out from the drive.

[Means for Solving the Problems]

In accordance with the present invention, there is provided a disc tray having a tray main body to which disc holders are mounted at a plurality of portions in the periphery of a disc set portion so as to be capable of moving in and out between a closed position preventing a disc set in the disc set portion from falling down and an open position making it possible to take the disc in and out the disc set portion, provided with a movable connecting member transmitting an opening and closing operation of optional one disc holder to the other disc holders so as to open and close the other disc holders.

In accordance with the present invention, it is possible to employ the structure in which the respective disc holders swing so as to move in and out between the closed position and the open position, swing center portions of the respective disc holders and swing members corresponding to the respective disc holders are respectively connected to each other via respective rotary shafts rotatably extending through and inserted to a plurality of portions of the tray main body, and the movable connecting member has a function of simultaneously moving the respective disc holders between the closed position and the open position via the respective rotary shafts by forward and backward swinging the respective swing members through the push pull operation, and in this case, it is possible to employ the structure in which the swing member are gears, and rack portions engaged with the gears forming the respective swing members are provided in the movable body.

In accordance with this invention, when setting the disc to the disc set portion, the optional one disc holder is protruded out from the open position to the closed position after setting the disc, so that the other disc holder protrudes out from the open position to the closed position so as to prevent the disc from falling away. Further, at a time of taking out the disc from the disc set portion, the optional one disc holder is moved backward from the closed position to the open position, so that the other disc holders move backward from the closed position to the open position so as to make it possible to take out the disc.

In accordance with the present invention, the movable connecting member can suitably employ various kinds of mechanisms such as a structure utilizing a broken type link corresponding to a swing member and the like in addition to a combination between the gear and the rack portion corresponding to the swing member mentioned above.

Further, in accordance with the present invention, it is desirable that the structure is made such that the disc holders are arranged in a front side of the tray main body in which the disc set portion is formed in a front side, the swing members and the movable connecting member are arranged in a back side of the tray main body.

Further, in accordance with the present invention, it is possible to employ a structure in which the disc holders are mounted to three or more portions in the disc set portion, the movable connecting member has a plurality of rod bodies provided with rack portions, and the rack portions of the rod bodies are respectively engaged with the gears in which two gears constitute one pair.

In accordance with the present invention, it is desirable that the structure is made such that a rack capable of engaging with a tray driving gear placed in a drive side for pushing and pulling the disc tray mounted to the drive is mounted to any one of the rod bodies, the disc tray is completely pulled to the drive, whereby the rack interlocks with the tray driving gear, and the rack interlocking with the tray driving gear moves the rod body in a direction of moving in and out the disc holder between the closed position and the open position through a rotation of the tray driving gear. Further, it is desirable that the structure is made such that a disc chucking operation executed after the disc tray is completely pulled to the drive and an operation of moving the rod body in the direction in which the rack moves backward the disc holders from the closed position to the open position are executed in parallel, and a disc unchucking operation executed before the disc tray is pushed out from the drive and an operation of moving the rod body in a direction in which the rack protrudes out the disc holder from the open position to the closed position are executed in parallel.

In accordance with the structure mentioned above, when the disc tray is pulled in or pushed out with respect to the drive, the disc is held in the disc set portion by the disc holder so as to be prevented from falling away, and on the contrary during the disc rotation for recording on and reproducing the disc, the disc holder is moved backward to the open position so as to be prevented from being brought in to contact with the disc, so that it is possible to previously prevent the disc from being accidentally brought into contact with the disc holder so as to be injured during the disc rotation.

In this case, the subject to be required to prevent the disc set to the disc set portion from falling away by means of the disc holder is mainly the disc tray equipped in the drive in the vertical attitude, however, there is a case that the drive is used in the horizontal attitude, and in such a case, it is desirable that the structure is made such that the disc holder can be kept in the backward moved state at the open position.

In order to make the disc tray in accordance with the present invention correspond to this requirement, it is desirable that the rack can move between an operation position capable of interlocking with the tray driving gear and an evacuated position not interlocking with the tray driving gear.

DETAILED DESCRIPTION OF THE PREFERRED EMBODIMENTS

[Mode for Carrying Out the Invention]

Figure 1:
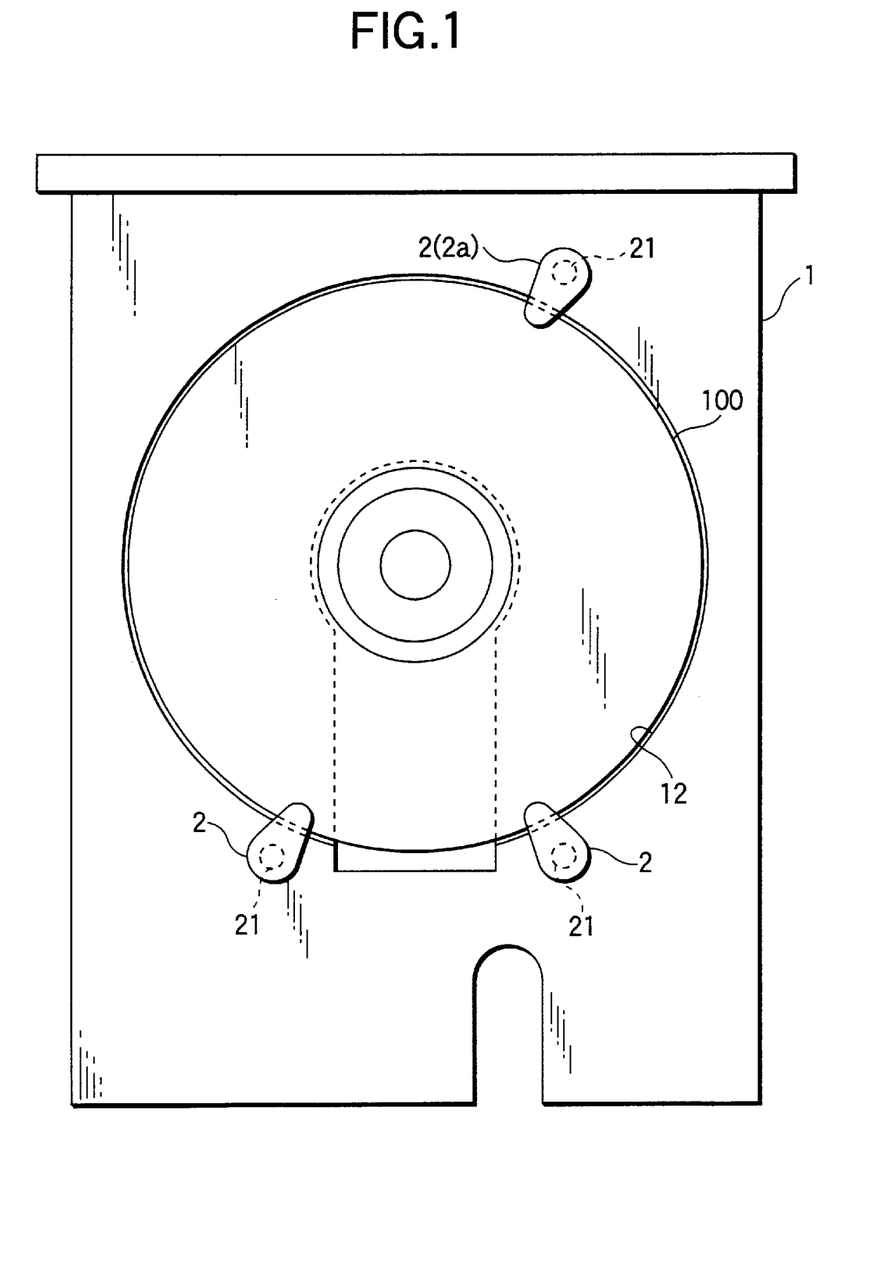
FIG. 1 is a front elevational view of a first embodiment of a disc tray in accordance with the present invention.
Figure 2:
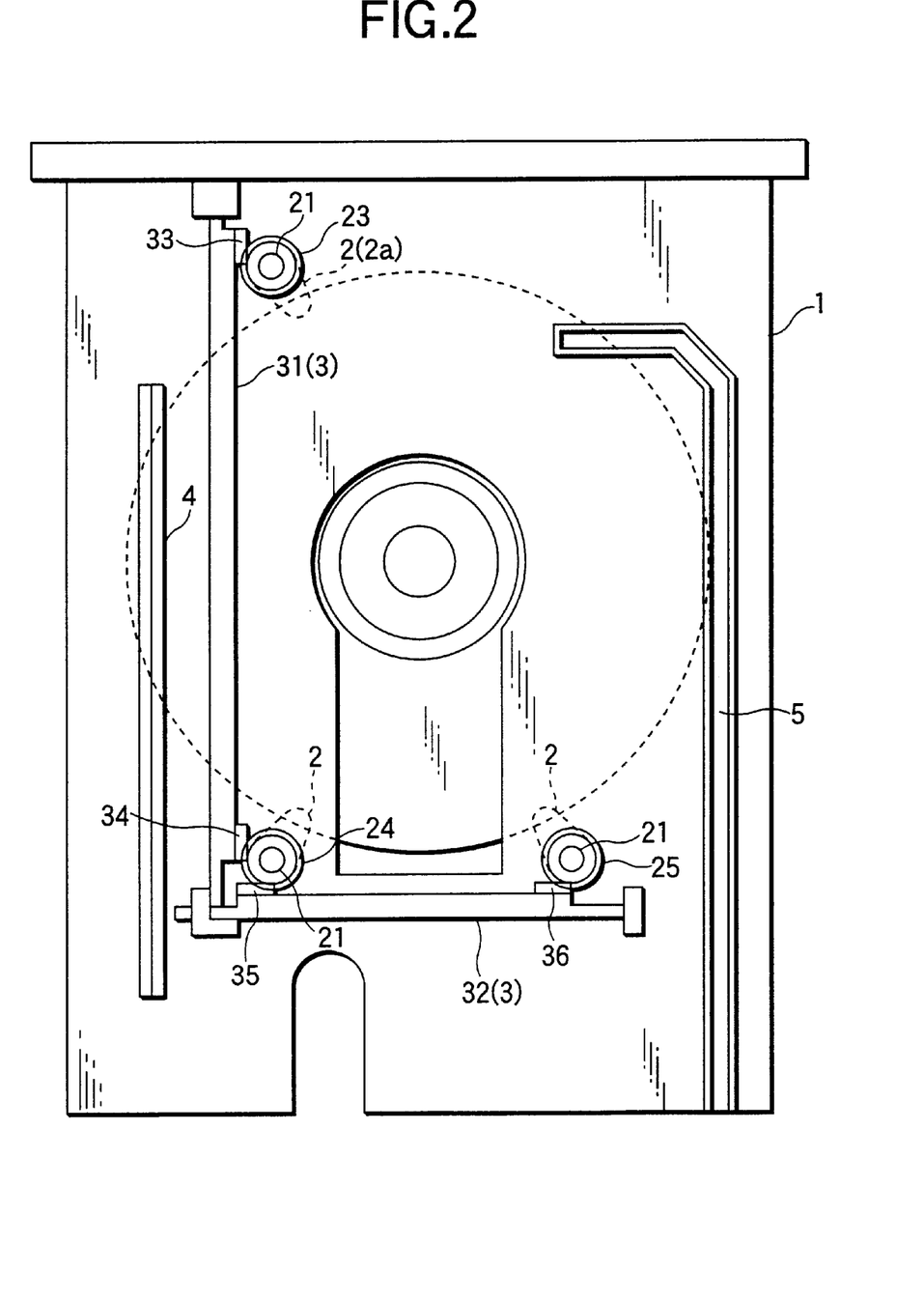
FIG. 2 is a back elevational view of the same.
Figure 3:
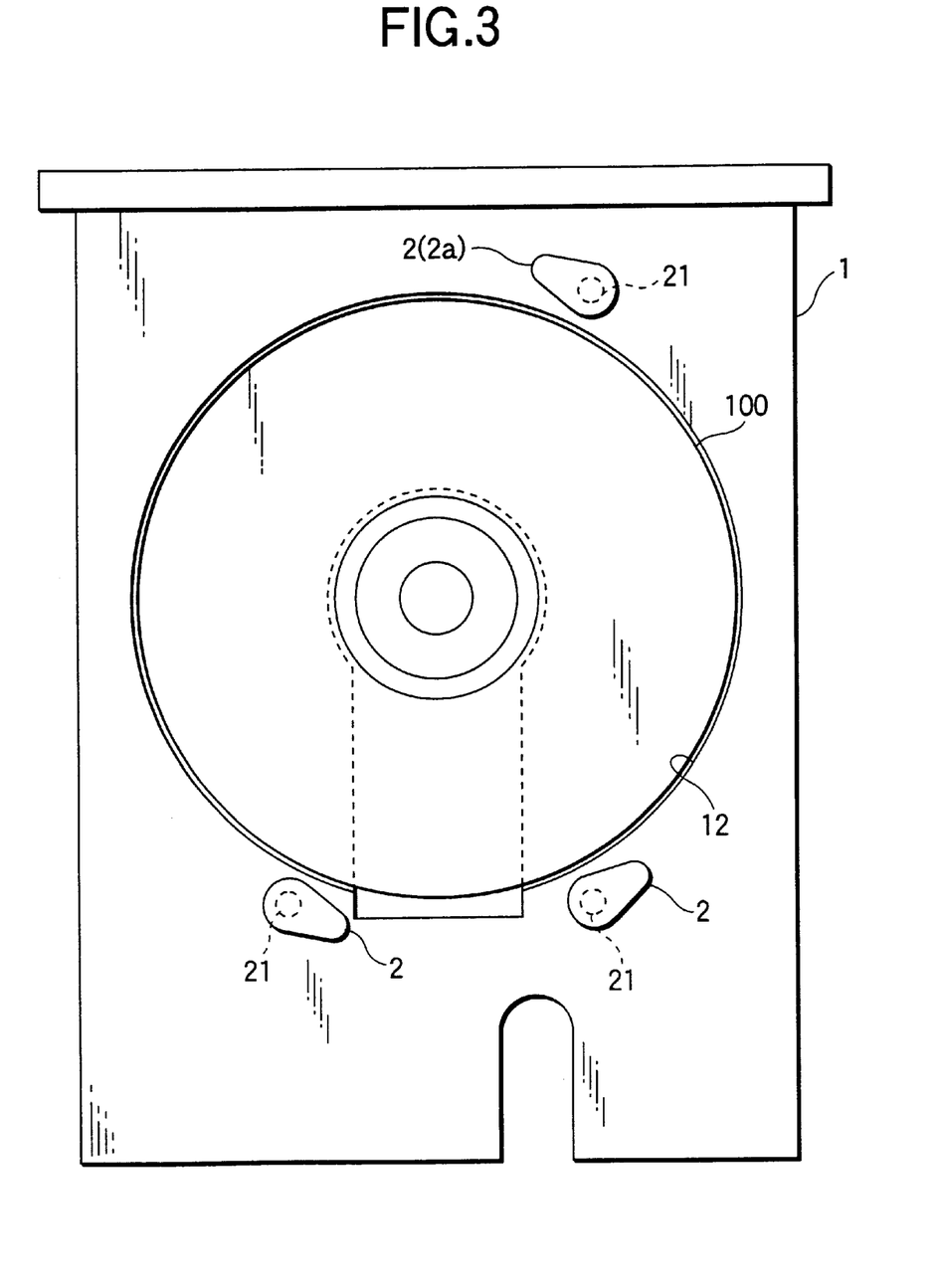
FIG. 3 is a front elevational view of the same in another state.
Figure 4:
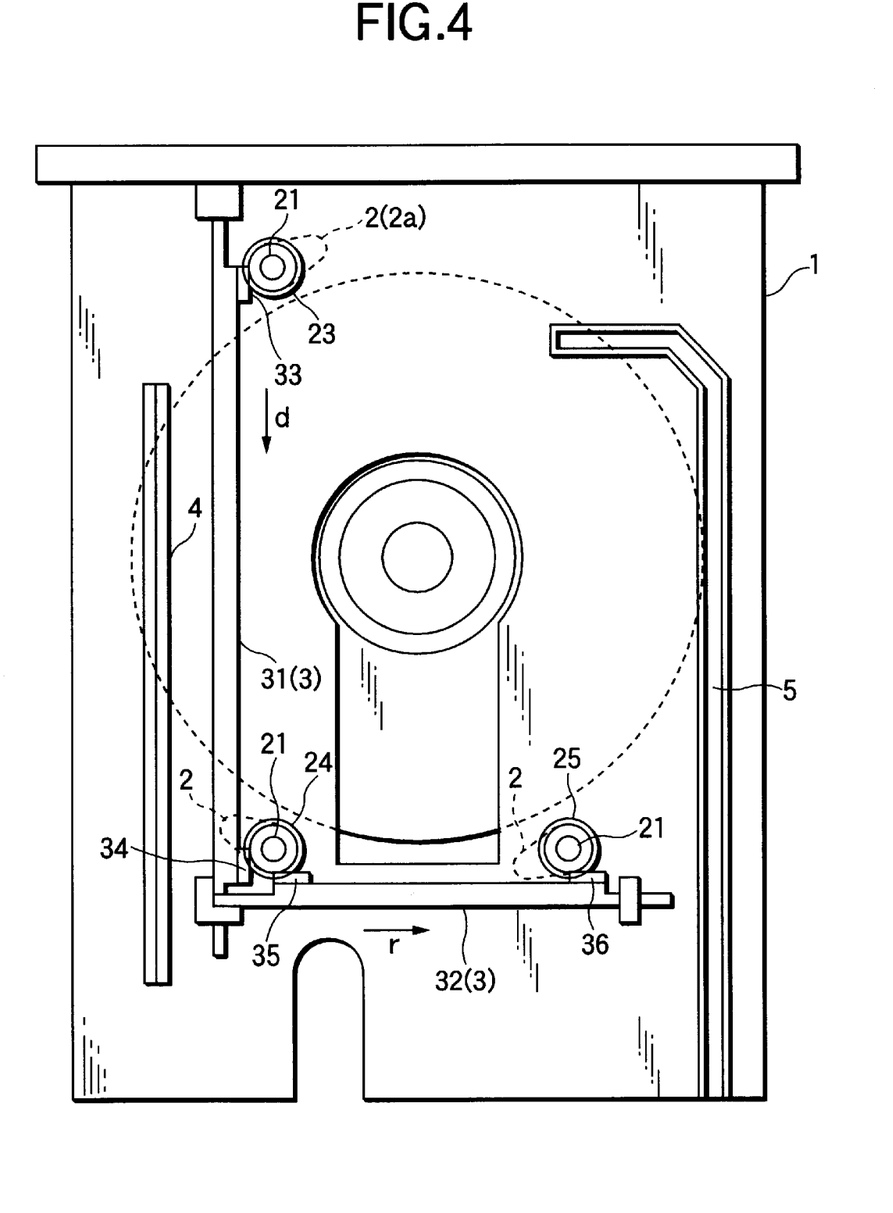
FIG. 4 is a back elevational view of the same in the other state.
Figure 5:
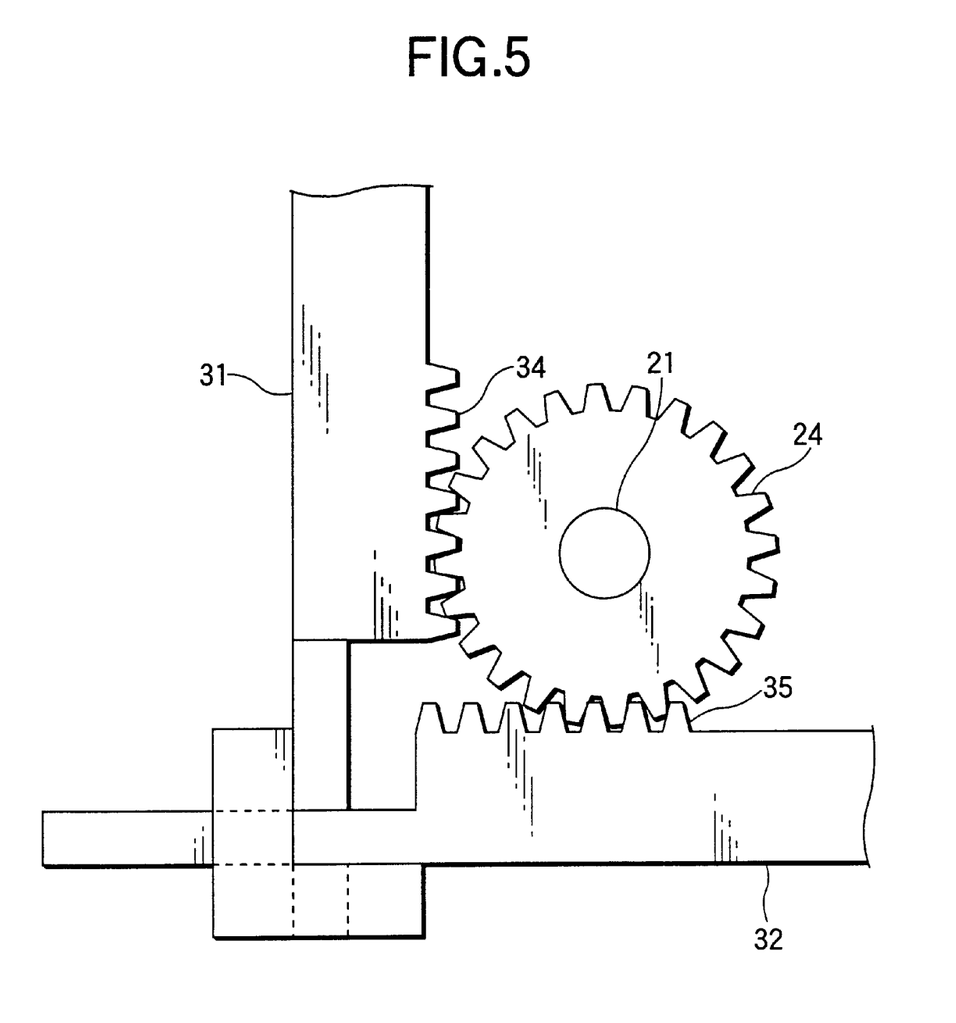
FIG. 5 is an enlarged back elevational view of a main portion.

FIG. 1 is a front elevational view of a first embodiment of a disc tray in accordance with the present invention, FIG. 2 is a back elevational view of the same, and FIG. 3 is a front elevational view of the same in another state, FIG. 4 is a back elevational view of the same in a state of the other state, and FIG. 5 is an enlarged back elevational view of a main portion.

A disc tray T in an illustrated embodiment is mounted to a drive D (not shown), and is pulled into the drive or pushed out from the drive by operating an operation button (not shown). The disc tray T has a tray main body 1 formed in a rectangular flat shape in a front elevational view, a disc set portion 12 formed by a circular recess is provided in a center portion in a front side of the tray main body 1, and hook-shaped disc holders 2, . . . are attached to a plurality of portions (three portions in the illustrated embodiment) around the disc set portion 12. In particular, a rotary shaft 21 integrally formed with each of the disc holders 2 extends through and inserted to a through hole (not shown) provided in the tray main body 1 with no play. Accordingly, the disc holder 2 is structured such as to swing around the rotary shaft 21 corresponding to a center of swing between a closed position preventing a disc 100 set to the disc set portion 12 as shown in FIG. 1 from falling away and an open position moving backward to an outer side of the disc set portion 12 as shown in FIG. 3 so as to move in and out.

As shown in FIG. 2 or 4, a movable connecting member 3 is arranged in a backside of the tray main body 1 in a state of overlapping with the tray main body 1. The movable connecting member 3 is provided with a first rod body 31 arranged in one side in a lateral direction of the tray main body 1 and being long in a longitudinal direction, and a second rod body 32 arranged in a rear end side of the tray main body 1 and being long in a lateral direction, rack portions 33, 34, 35 and 36 are provided in both end portions of the respective rod bodies 31 and 32, the first rod body 31 is held to the tray main body 1 so as to freely move in the longitudinal direction, and the second rod body 32 is held to the tray main body 1 so as to freely move in the lateral direction. Further, a gear corresponding to an opposite element to the rack portion 33 is adhered to a rotary shaft 21 of the disc holder 23 arranged in a front side of the tray main body 1 (refer to FIG. 5), a gear 24 corresponding to an opposite element to two rack portions 34 and 35 is adhered to the rotary shaft 21 of one disc holder 2 arranged in a rear side of the tray main body 1, and a gear 25 corresponding to an opposite element to the rack portion 36 is adhered to the rotary shaft 21 of another disc holder 2 arranged in the rear side of the tray main body 1.

In this case, reference numeral 4 denotes a long rack longitudinally provided in a back side of the tray main body 1, reference numeral 5 denotes a guide groove, and a description will be given later of these elements.

In the disc tray T described in FIGS. 1 to 4, when swinging one of three disc holders 2, . . . , for example, a disc holder 2 (2a arranged in the front side of the tray main body 1 in a clockwise direction from the closed position in FIG. 1 by using the finger, thereby moving backward to the open position in FIG. 3, a swing motion of the disc holder 2a is transmitted to the rack portion 33 via the rotary shaft 21 and the gear so as to be converted into a linear motion of the first rod body 31. Accordingly, as is understood by viewing both of FIGS. 2 and 4, the first rod body 31 moves backward as shown by an arrow d in FIG. 4, the backward movement is converted into the rotational motion of the gear 24 via the rack portion 34, and the rotational motion of the gear 24 is transmitted to the rack portion 35 so as to be converted into a rightward movement (a linear motion) shown by an arrow r of the second rod body 32. Further, the rightward movement of the second rod body 32 is converted into the rotational motion of the gear 25 via the rack portion 36. Accordingly, two disc holders 2 and 2 connected to the gear 24 and the gear 25 also swing in a clockwise direction to the open position in FIG. 2 from the closed position in FIG. 1 along with the disc holder 2a mentioned above. In this state, it is possible to take out the disc 100 from the dies set portion 12. In the case of swinging one of the other disc holder 2, . . . in a clockwise direction from the closed position in FIG. 1, by using the finger, thereby moving backward to the open position in FIG. 2, the other two disc holders 2, . . . also swing from the closed position to the open position along therewith in the same manner. On the contrary, when swinging optional one of three disc holders 2, . . . in a counterclockwise direction from the open position in FIG. 2 by using the finger, thereby protruding out to the closed position in FIG. 1, the other two disc holders 2, . . . protrude out to the closed position in FIG. 1 from the open position in FIG. 2 along therewith. In this state, the disc 100 is held in the disc set portion 12 so as to be prevented from falling away.

Since the swinging operation of the optional one disc holder 2 at a time of taking in and out the disc 100 as mentioned above can be easily executed by one thumb holding the disc 100, it is possible to easily take the disc 100 in and out the disc set portion 12 by using only one hand.

In the description mentioned above, the structure is made such that the respective gears 23, 24 and 25 are forward and backward swung through the push pull operation of the first and second rod bodies 31 and 32 forming the movable connecting member 3. Accordingly, the gears 23, 24 and 25 serve as a swing member operating through the push pull operation of the movable connecting member 3.

Figure 6:
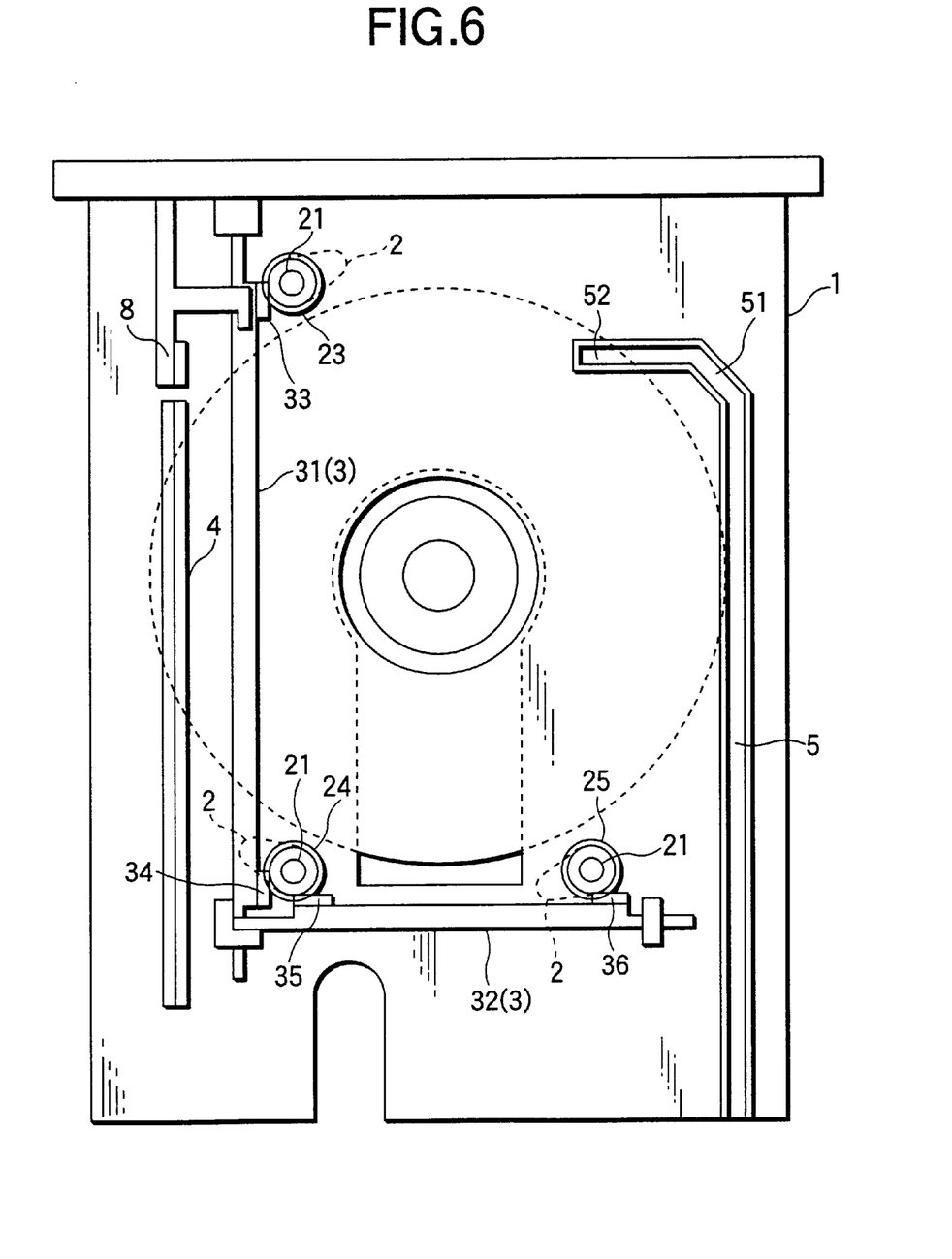
FIG. 6 is a back elevational view of a second embodiment.
Figure 7:
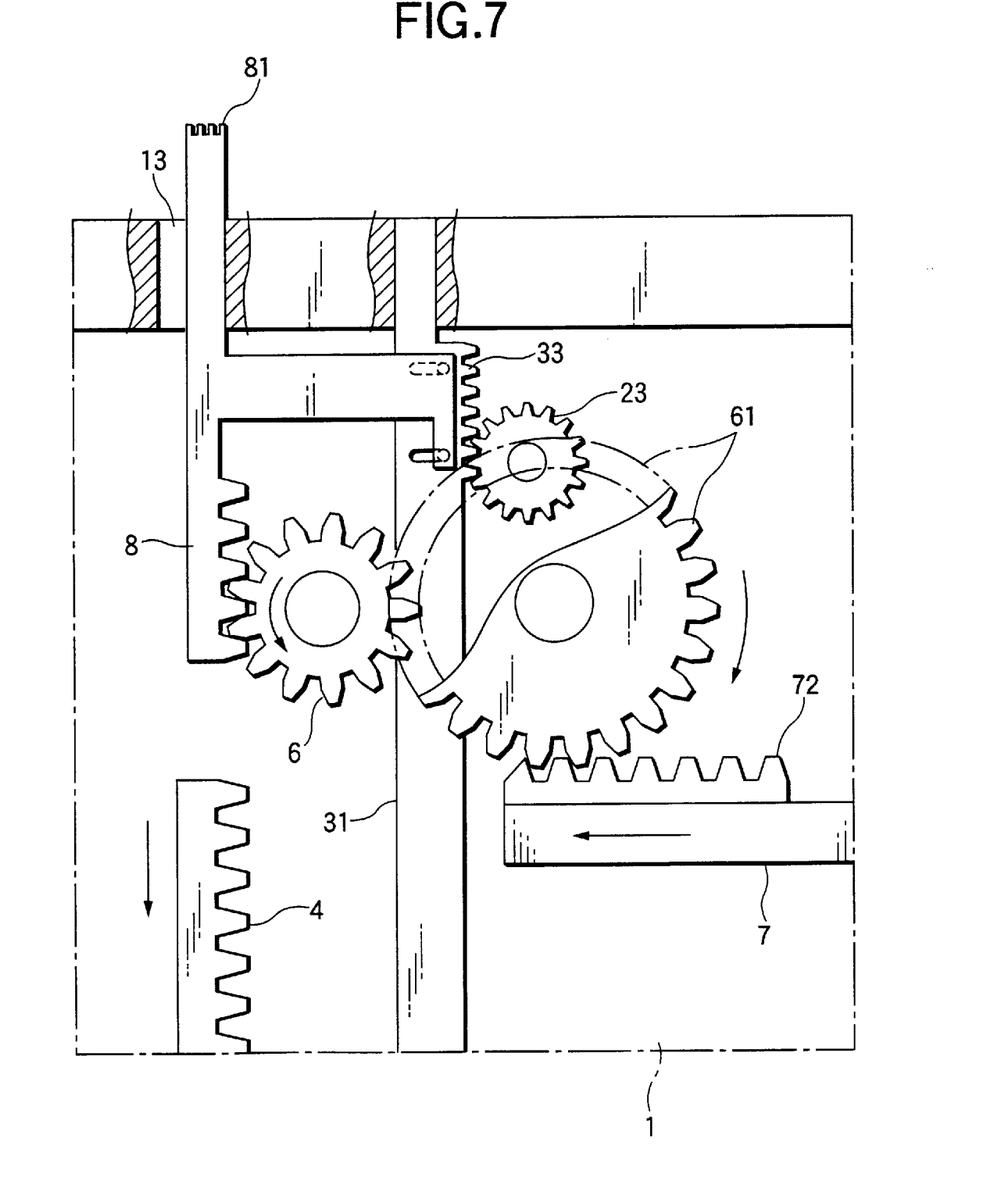
FIG. 7 is a view describing an operation.
Figure 8:
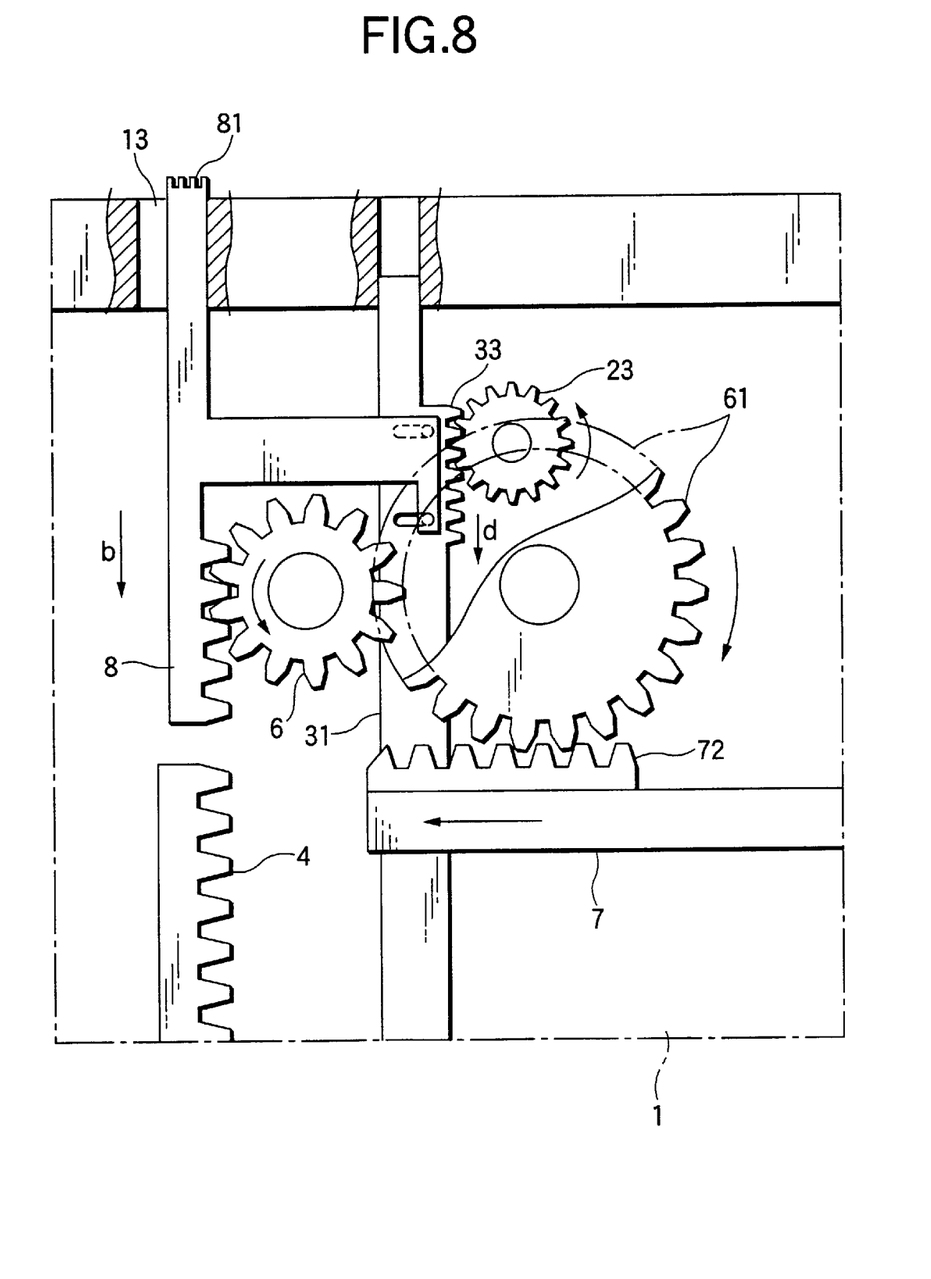
FIG. 8 is a view describing an operation.
Figure 9:
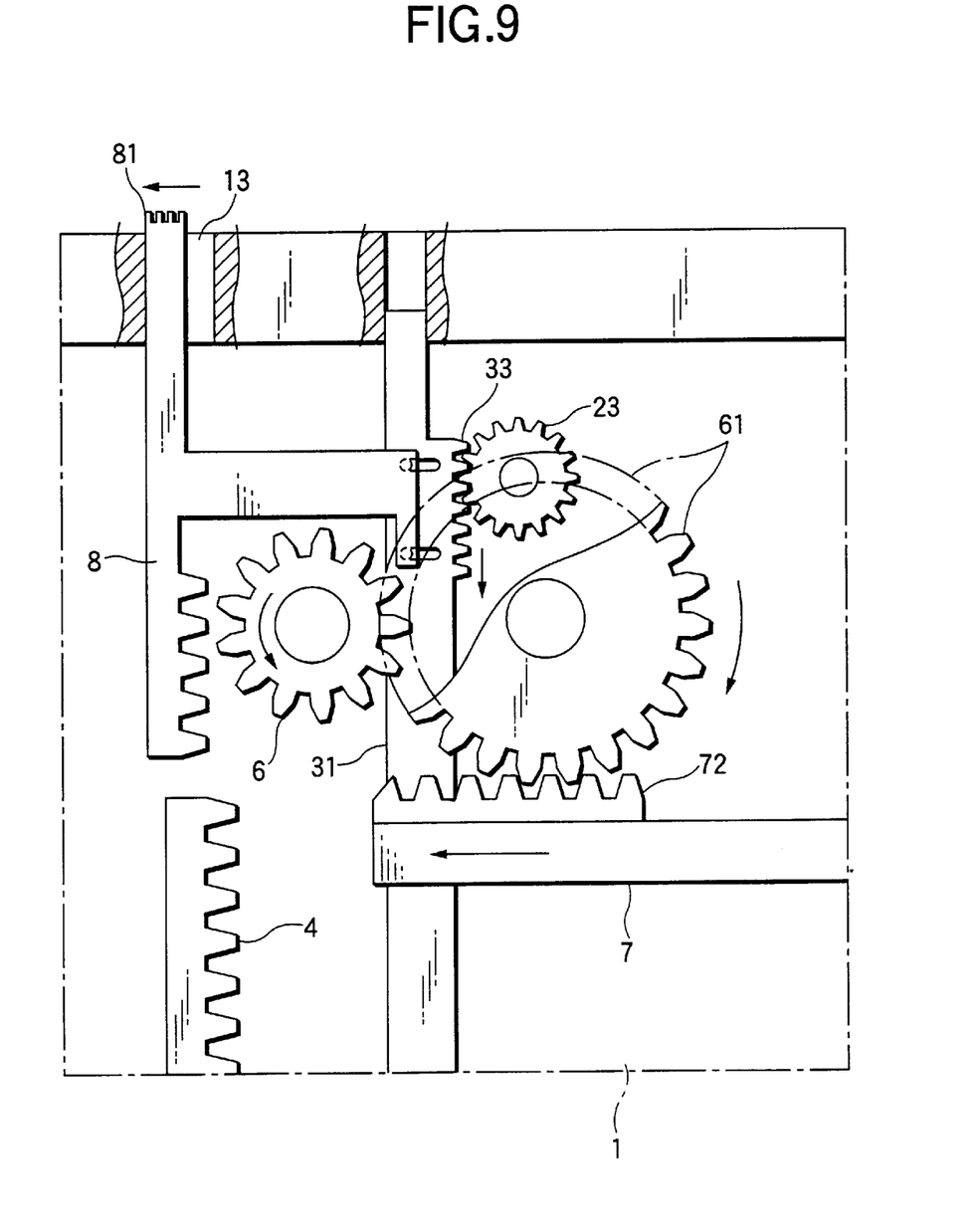
FIG. 9 is a view describing an operation.
Figure 10:
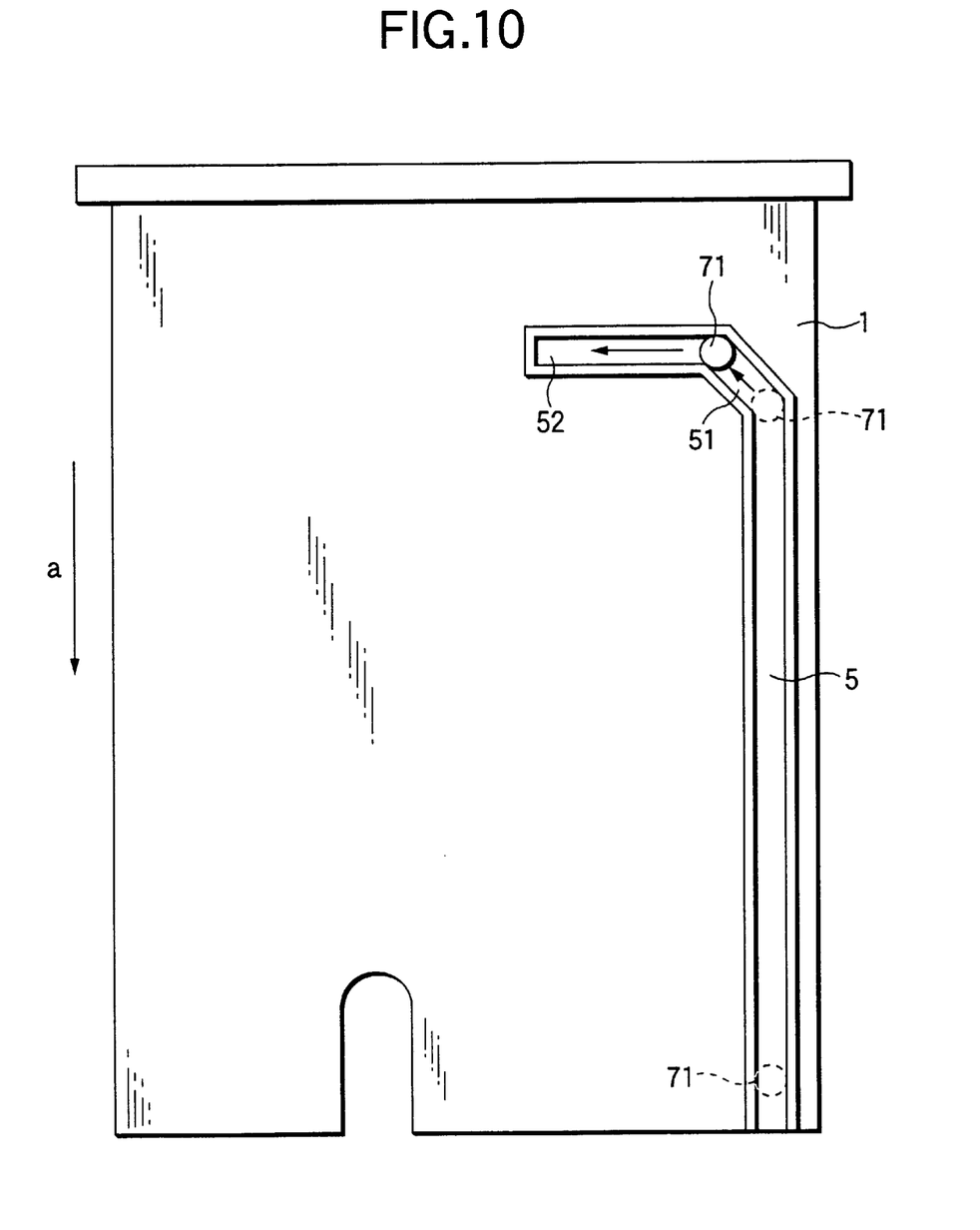
FIG. 10 is a schematic view showing a shape of a guide groove.

Next, a description will be given of a second embodiment. FIG. 6 is a back elevational view of the second embodiment, FIGS. 7 to 9 are views describing an operation, and FIG. 10 is a schematic view showing a shape of a guide groove 5.

This second embodiment is structured such that a plurality of disc holders 2, . . . positioned at a closed position automatically move backward to an open position in parallel to a disc chucking operation executed after a disc tray T is completely taken in a drive, and a plurality of disc holders 2, . . . positioned at the open position automatically protrude out to the closed position in parallel to a disc unchucking operation executed before the disc tray T is pressed out from the drive.

In this case, as shown in FIG. 6, a rack 4 and a guide groove 5 which are long in a longitudinal direction are provided in a back side of a tray main body 1.

Among them, the rack 4 can be engaged with a motor drive type tray driving gear 6 (FIGS. 7 to 9) placed in a drive side to which the disc tray T is mounted. That is, in the case that a tray take-in command is generated by operating an operation button (not shown) when the disc tray T is pushed out from the drive, a middle gear 61 shown in FIGS. 7 to 9 is forward rotated by a motor (not shown), and a rotation of the middle gear 61 is transmitted to the tray driving gear 6 always engaged therewith. Accordingly, a rotation of the tray driving gear 6 is transmitted to the rack 4 engaged therewith and the disc tray T is taken in to the drive. Further, in the case that a tray push-out command is generated by operating an operation button (not shown) when the disc tray T is taken in to the drive and the tray driving gear 6 is engaged with the rack 4, the middle gear 61 shown in FIGS. 7 to 9 is backward rotated by the motor mentioned above, the rotation of the middle gear 61 is transmitted to the rack 4 via the tray driving gear 6, and the disc tray T is pushed out from the drive.

On the contrary, the guide groove 5 is provided for the purpose of executing an operation of further completely taking in the disc tray T taken in to the drive due to the engagement between the tray driving gear 6 and the rack 4 to the drive so as to move the rack 4 apart from the tray driving gear 6 as shown in FIGS. 7 to 9 (a final take-in operation), a disc chucking operation of chucking the disc 100 held in the completely taken disc tray T to a turn table (not shown) equipped in the drive side, a disc unchucking operation of releasing the disc from the turn table before the disc tray T is completely pushed out from the completely taken position, an operation of moving the disc tray T a little in a pressing direction so as to engage the rack 4 with the tray driving gear 6 (a pressing assist operation), and the like. A description will be given of these points with reference to FIGS. 7 to 9.

That is, a transverse member 7 provided with a projection 71 always fitting to the guide groove 5 is mounted to the drive side, a rack portion 72 capable of engaging with the middle gear 61, a cam groove (not shown) and the like are provided in the transverse member 7, and an engagement element for operating a chucking mechanism (not shown) is slidably engaged with the cam groove. Further, when the disc tray T is taken out, the project 71 is positioned near a portion shown by a broken line in FIG. 10 in the guide groove 5, and the projection 71 relatively moves within the guide groove 5 in correspondence that the disc tray T is taken in as shown by an arrow a in FIG. 10 so as to reach an inclined portion 51 in the guide groove 5 as shown by a broken line in FIG. 10. Thereafter, when the disc tray T is a little taken in, the projection 71 is fitted to the inclined portion 51 and is transversely moved a little by the inclined portion 51. In accordance therewith, the transverse member 7 transversely moves a little, and an end portion of a rack portion 72 in the transverse member 7 is engaged with the middle gear 61 as shown in FIG. 7. At this time, the rack 4 in the tray main body 1 side engaged with the tray driving gear 6 moves apart from the tray driving gear 6 as shown in the same drawing. When the transverse member 7 transversely moves via the rack 72 due to the thereafter rotation of the middle gear 61, the take-in operation of the disc tray T is continued until the projection 71 reaches an end portion of the inclined portion 51 shown by a solid line in FIG. 10, the projection 71 moves out of the inclined portion 51, whereby the disc tray T is completely taken in, and it is detected that the projection 71 reaches the end portion 52 of the guide groove 5 together with the transverse member 7, whereby the rotation of the motor rotating the middle gear 61 is stopped. Further, during the transverse movement of the transverse member 7, the engagement element sliding on the cam groove operates the chucking mechanism so as to chuck the disc against the turntable. This operation corresponds to the disc chucking operation. The disc unchucking operation is executed by an operation that the middle gear 61 is backward rotated by the motor and the transverse member 7 transversely moves in an opposite direction. Further, since the projection 71 relatively moves the inclined portion 51 of the guide groove 5 in the opposite direction to the direction mentioned above in the final stage that the transverse member 7 transversely moves in the opposite direction, the projection 71 pushes the inclined portion 51 during the time so as to push out the disc tray T a little. Accordingly, the end portion of the rack 4 in the tray main body 1 is engaged with the tray driving gear 6 and thereafter, the disc tray T is pulled out due to the rotation of the tray driving gear 6.

In accordance with the second embodiment, a movable connecting member 3 and gears 23, 24 and 25 having the same structure as those shown in FIGS. 2 and 4 are provided in the tray main body 1. Further, in accordance with the second embodiment, as shown in FIG. 6, a rack 8 is mounted to a first rod body 31 of the movable connecting member 3. Further, as shown in FIG. 7, the structure is made such that the rack 8 is engaged with the tray driving gear 6 in exact timing with that the end portion of the rack portion 72 in the transverse member 7 mentioned above is engaged with the middle gear 61 as shown in the same drawing. Accordingly, while the disc chucking operation mentioned above is executed through the transverse movement of the transverse member 7, the rack 8 moves backward as shown by an arrow b in FIG. 8 due to the rotation of the tray driving gear 6 in parallel thereto, and the rack 8 backward moves the first rod body 31 as shown by an arrow d. Accordingly, as is known from the description with respect to the first embodiment, three disc holders 2, . . . positioned at the closed position shown in FIG. 1 swing to the open position in FIG. 3 along therewith so as to backward move. Accordingly, at a time when the disc chucking operation is finished, the disc 100 becomes in a released state that the disc 100 (refer to FIG. 1 or the like) is not held to the disc holders 2, . . . , so that there is no disadvantage that the disc holders 2, . . . are brought into contact with the disc due to the thereafter rotation of the disc so as to damage the disc.

Further, when the disc unchucking operation is executed in the state that the disc tray T is completely taken in, the tray driving gear 6 also rotates backward due to the backward rotation of the middle gear 61 during the operation, the rack 8 moves forward as shown by the arrow b in FIG. 8 due to the backward rotation of the tray driving gear 6 mentioned above, and the rack 8 forward moves the first rod body 31 as shown by an inverted arrow d. Accordingly, as is known from the description with respect to the first embodiment, three disc holders 2, . . . positioned at the open position shown in FIG. 3 swing to the closed position in FIG. 1 along therewith so as to protrude out. Accordingly, at a time when the disc unchucking operation is finished, the disc 100 becomes in a held state that the disc 100 (refer to FIG. 1 or the like) is held by the disc holders 2, . . . , so that there is not generated the matter that the disc 100 falls away from the disc set portion 12 even when the disc tray T is thereafter taken out.

In this case, when the disc tray T is pulled out, the engagement between the tray driving gear 6 and the rack 8 is cancelled. Accordingly, when taking in and out the disc with respect to the disc tray T taken out from the drive, as is described with respect to the first embodiment, all of the disc holders 2, . . . are moved backward to the open position by swinging the optional one disc holder 2 by the finger and thereafter, the disc is taken in and out.

In accordance with the second embodiment mentioned above, there is employed the structure in which the tray driving gear 6 and the rack 8 are directly engaged with each other, however, with respect to this point, another gear may be interposed between the tray driving gear and the rack. In summary, it is sufficient that the structure is made such that the rack interlocks with the tray driving gear.

In this case, in the first embodiment described with reference to FIGS. 1 to 5, since it is possible to define all of the disc holders 2, . . . to the closed position or the open position by swinging the optional one disc holder 2 by the finger, in the case of using the drive in the vertical attitude, it is sufficient to swing the optional disc holder 2 by the finger at a time of attaching and detaching the disc to and from the disc tray T so as to move backward all of the disc holders 2, . . . from the closed position to the open position. Further, in the case of using the drive in the horizontal attitude, it is sufficient to keep moving backward the disc holders 2, . . . to the open position.

On the contrary, in accordance with the second embodiment described with reference to FIGS. 6 to 9, the structure is made such that the disc holders 2, . . . automatically move backward from the closed position to the open position in parallel to the disc chucking operation, and the disc holders 2, . . . automatically protrude out from the open position to the closed position in parallel to the disc unchucking operation. Further, when the disc tray T is pulled in or pushed out with respect to the drive, it is assumed that the disc holders 2, . . . protrude out to the closed position. The use condition mentioned above is preferable in view of preventing the disc from falling away at a time of taking in and out the disc tray T in the case that the drive is used in the vertical attitude. However, in the case of the drive attitude in which the disc is not required to be held by the disc holders 2, . . . , that is, in the case that the drive is used in the horizontal attitude, it is not preferable in view that the disc holder 2 stands in the way of taking in and out the disc that the disc holders 2, . . . protrude out to the closed position when the disc tray T is pulled in and pushed out with respect to the drive. Accordingly, in accordance with the disc tray of the second embodiment, it is desirable that the member capable of always holding the disc holder 2 at the open position is provided, taking the matter that the drive may be used in the horizontal attitude into consideration.

A description will be given next of the member mentioned above. That is, as shown in FIGS. 7 to 9, an operation knob 81 is additionally provided in the rack 8, and the operation knob 81 is protruded out forward from a hole portion 13 formed in a front end portion of the tray main body 1. Further, the structure is made such that the rack 8 can be moved between an operation position at which the rack 8 can engaged with the tray driving gear 6 (a position shown in FIGS. 7 and 8) and an evacuated position at which the rack 8 cannot engage with the tray driving gear (a position shown in FIG. 9), by transversely moving the operation knob 81 in a lateral direction within the hole portion 13. In this case, when transversely moving the operation knob 81, it is desirable to provide with a guide surface for smoothly transversely moving the rack 8 following to the operation knob 81, however, in FIGS. 7 to 9, the guide surface for executing the operation mentioned above is omitted.

In accordance with the structure mentioned above, for example, in the case that the disc tray T is pulled out, since the rack 8 does not engage with the tray driving gear 6 even during the disc chucking operation and the disc unchucking operation after the disc tray T is pulled in, by transversely moving the operation knob 81 so as to position the rack 8 at the evacuated position incapable of engaging with the tray driving gear as shown in FIG. 9, it is possible to keep moving backward the disc holder 2 to the open position.

In the description mentioned above, in FIGS. 1 to 10, in order to avoid an overlapping description, the same reference numerals are attached to the same or corresponding portions.

[Effect of the Invention]

As mentioned above, in accordance with the present invention, since the disc holders at a plurality of portions simultaneously operate in the same manner only by operating one disc holder at a time of attaching and detaching the disc, whereby it is possible to set the disc to the disc set portion without falling away and safely take out the disc from the disc set portion. Accordingly, it is unnecessary to execute the troublesome operation of individually operating the disc holders one by one as in the conventional manner and a usability can be improved at that degree. Further, there is an advantage that it is possible to set the disc to the disc set portion and take out the disc from the disc set portion by using only one hand.

Further, when the disc chucking operation and the disc unchucking operation are executed, these operations and the operation of opening and closing the disc holder can be automatically executed in parallel manner, so that particularly in the case of using the drive in the vertical attitude, there can be obtained an excellent effect that it is possible to prevent the disc from falling away at a time of taking in and out the disc tray and it is possible to protect the disc by releasing the disc holder from the disc at a time of recording and reproducing the disc.

In this case, in the case of using the drive in the horizontal attitude in which the disc is not required to be held by the disc holder, since it is possible to take the disc holder away from the position standing in the way of moving in and out the disc, the drive equipped with the disc tray in accordance with the present invention can be applied to the vertical attitude and the horizontal attitude.

What is claimed is:

1. A disc tray comprising:

a tray main body to which disc holders are mounted at a plurality of portions in the periphery of a disc set portion to be capable of moving in and out between a closed position for preventing a disc in said disc set portion from falling down and an open position for being capable to take the disc in and out said disc set portion, wherein swing center portions of said respective disc holders and swing members corresponding to said respective disc holders are respectively connected to each other via respective rotary shafts rotatably extending through and inserted to a plurality of portions of said tray main body;

a movable connecting member transmitting an opening and closing operation of optional one disc holder to the other disc holders to open and close said other disc holders, said movable connecting member has a function of simultaneously moving said respective disc holders between the closed position and the open position via said respective rotary shafts by forward and backward swinging said respective swing members through a push pull operation, wherein said movable connecting member has a plurality of rod bodies provided with rack portions, and the rack portions of said rod bodies are respectively engaged with gears in which two gears constitute one pair;

a rack capable of engaging with a tray driving gear placed in a drive side for pushing and pulling said disc tray mounted to a drive is mounted to any one of said rod bodies, said disc tray is completely pulled to said drive so that said rack interlocks with said tray driving gear, and said rack interlocking with said tray driving gear moves said rod body in a direction of moving in and out said disc holder between the closed position and the open position through a rotation of said tray driving gear.

2. The disc tray as claimed in claim 1, wherein said swing members are gears, and rack portions engaged with said gears forming said respective swing members are provided in said movable connecting member.

3. The disc tray as claimed in claim 1, wherein said disc holders are arranged in a front side of said tray main body in which the disc set portion is formed in a front side, and said swing members and said movable connecting member are arranged in a back side of said tray main body.

4. The disc tray as claimed in claim 1, wherein said disc holders are mounted to three or more portions in said disc set portion.

5. The disc tray as claimed in claim 1, wherein a disc chucking operation executed after said disc tray is completely pulled to said drive, and an operation of moving said rod body in the direction in which said rack moves backward said disc holders from the closed position to the open position are executed in parallel, and a disc unchucking operation executed before said disc tray is pushed out from said drive, and an operation of moving said rod body in a direction in which said rack protrudes out of said disc holder from the open position to the closed position are executed in parallel.

6. The disc tray as claimed in claim 1, wherein said rack is movable between an operation position capable of interlocking with said tray driving gear and an evacuated position not interlocking with said tray driving gear.

7. The disc tray as claimed in claim 1, wherein a transverse member is transversely moved by an inclined portion of a guide groove, wherein the transverse member engages a middle gear that rotates the tray driving gear and moves the rack capable of engaging the tray driving gear, the rack capable of engaging the tray driving gear is connected to a rod body that engages a gear connected to the disc holder, and the rod body is moved along a direction of a taking in and out the disc tray.

* * * * *